Patented June 22, 1926.

1,589,866

UNITED STATES PATENT OFFICE.

EDOUARD HORACE SIEGLER, OF TAKOMA PARK, AND CHARLES HOLCOMB POPENOE, OF SILVER SPRING, MARYLAND.

INSECTICIDE AND PROCESS OF PREPARING THE SAME.

No Drawing. Application filed November 17, 1924. Serial No. 750,447.

This invention relates to compositions of matter valuable for destroying plant parasites, and has for its object the utilization of the insecticidal properties of certain free aliphatic organic acids, including those having other elements or groups substituted for hydrogen on the carbon atoms composing the radicle attached to the carboxyl group, and particularly the normal monobasic aliphatic acids containing more than five carbon atoms and occurring naturally in coconut oil by combining them with suitable vehicles for their effective application either as liquid sprays or as dusts for insecticidal purposes.

Herein, the term "insecticide" is comprehensively used to include fungicides. The term "plant" is used in a broad sense to include not only herbaceous varieties but also trees, shrubs and the like. The term "free" is used to designate acids in a chemically uncombined condition. The term "added ingredient" implies one which is added to a composition of matter already containing ingredients useful for destroying plant parasites, thereby modifying and increasing the effective properties of such composition.

The term "aliphatic" is construed as defining those organic (carbon) acids regarded as derivatives of methane, and consisting of continuous open chains of carbon atoms. The term "acid" is defined as including any carbon compound in which one or more carboxyl (COOH) groups are present. Typical examples of such compounds are: butyric acid

isobutyric acid

oleic acid

alpho-brom-caproic acid

succinamic acid

hydroxycaproic acid

A normal acid is defined as an acid in which the carbon atoms are united in a straight chain, such as normal butyric acid, shown above. A monobasic acid is one which contains a single carboxyl group, such as oleic acid, or lauric acid. Polybasic acids are those which contain more than one carboxyl group, such as succinic acid

An emulsion is defined as any combination of liquids in which one portion is disposed in the form of globules in another. An emulsifier is the agent promoting such disposition.

The higher aliphatic organic acids have heretofore been in use as insecticides only in chemical combination with alkalies in the form of soaps. As a result of considerable experimental research, we have established the fact that these acids are much more highly toxic to insect and fungus life in the free form than in combination with alkalies, thus constituting a new and novel application of this group of acids to plant pest control. In the acetic acid series, practicable toxicity begins with the acids containing six carbon atoms, and reaches a peak from the practical standpoint with the tenth to twelfth carbon atoms, namely capric and lauric acids. Palmitic and stearic acids also show material toxicity. Some toxicity is also shown by free oleic acid, and by members of the highly unsaturated acids occurring in corn, fish, and other animal and vegetable oils. The fatty acids occurring in coconut oil, primarily lauric acid and the nearly related caprylic, capric and myristic acids, however, appear to posses to the highest practical degree the characteristics necessary for the production of a satisfactory insecticidal preparation, being relatively low in melting point, highly toxic, and less influenced by the presence of calcium and magnesium salts in the water with which they may be combined to form a spray mixture than are some of their higher chemical homologues. The addition of a water-insoluble solvent such as benzol, any of the lighter hydrocarbon oils, or sulphonated oils reduces the melting point to a temperature compatible with use in cold water, increases spreading power and promotes thorough distribution of the active material, while tending to prevent the formation of alkaline soaps through combination of the fatty acids with alkaline carbonates in the water used for the spray mixture. An emulsion may be formed by passing the fatty acid, with or without the solvent, and with any required proportion of water, through a mechanical device designed to break up the fatty acid into finely divided globules which remain suspended in the water. Better results have, however, been obtained by using as an emulsifier one of the water-soluble colloidal agents, of which soap, casein and glue may be cited as examples.

The invention will be described by reference to a preferred embodiment thereof, it being understood that it is not limited to the specific materials or proportions hereinafter mentioned as illustrative. For example, the fatty acids may be added to lubricating oil emulsions, to suspensions of insoluble arsenicals, and to colloidal sulphur sprays with the effect of imparting their own qualities thereto. When used for the spraying of plants, they may be diluted to any desired extent, although we prefer in practice, mixtures containing from 250 to 1000 parts of other ingredients to one of the acids.

The principal inherent properties of the fatty acids, advantageous in their employment in insecticides, comprise a specific toxic action toward insects and fungi, the modification and improvement of the physical characteristics of solutions to which they may be added, by promoting adhesion to and spreading on foliage, neutralization of alkaline ingredients in water used in the spray mixture, thereby protecting stability of emulsions in which the fatty acids may be used, and decreasing the repellent action of arsenicals to certain insects. These properties are hereinafter referred to as the properties of the acid.

A typical mixture of coconut fatty acids preferably used by us as a base, and which is commonly used in the manufacture of soaps, contains the following fatty acids having insecticidal properties: Caproic, caprylic, capric, lauric, myristic, palmitic, oleic and stearic. Approximately 50 per cent of the mixture consists of lauric acid, which approaches the peak of practicable toxicity, although all of the other acids mentioned show some toxicity as contact insecticides when brought into direct contact with the breathing pores and integument of insects, even when higly diluted with some inert ingredient. The spores of apple scab are prevented from developing when treated with this mixture of acids under similar dilutions. The product exemplifying our invention in this disclosure, the mixture of coconut fatty acids referred to above, acts therefore both as an insecticide and a fungicide, capable of use by itself, as well as of being added to other insecticidal substances and compounds, the scope and effectiveness of which may thereby be increased.

An effective and convenient application of the use of coconut fatty acids in a spray mixture may be accomplished by diluting approximately 1 gallon of coconut fatty acids with an equal quantity of benzol gasoline. About four pounds of powdered glue is then dissolved in two and one-half gallons of water, and is then combined with the mixture of acids and gasoline. The whole is then brought into an emulsion by pumping the mixture back upon itself through a nozzle throwing a solid stream at a high pressure. The resulting emulsion is miscible with water over a wide range of proportions, although we find the amount prepared from the above formula most effective when diluted with from 250 to 1000 gallons of water. To provide a convenient and readily transportable product for commercial purposes the water content of such a stock emulsion need be no greater than is necessary to maintain a consistency capable of rady dilution to such proportions as may be required for direct application as a spray or dip, thus obviating transportation charges on excess inert material.

Coconut fatty acids and compounds containing them are compatible with many other insecticides, and may be applied therewith in combination, with the effect of both increasing the toxicity and improving the distribution of the compounds to which they may be added. Oil emulsions, miscible oil sprays and suspensions of arsenicals in water are benefited thereby.

We claim:

1. An insecticide, containing free lauric acid as an active toxic ingredient.

2. An insecticide containing free lauric acid in an amount sufficient to impart the properties of the acid thereto.

3. An insecticide, containing in the free condition any of the fatty acids present in coconut oil, as an active toxic ingredient.

4. An insecticide containing in the free condition any of the fatty acids present in coconut oil, in an amount sufficient to impart the properties of such fatty acid thereto.

5. An insecticide, containing as an active toxic ingredient any free aliphatic acid having more than four carbon atoms in the radicle attached to the carboxyl group.

6. An insecticide, containing any free aliphatic acid having more than four carbon atoms in the radicle attached to the carboxyl group, in an amount sufficient to impart the properties of such acid thereto.

7. An insecticide, containing as an active toxic ingredient any free normal monobasic aliphatic acid having more than four carbon atoms in the radicle attached to the carboxyl group.

8. An insecticide, containing any free normal monobasic aliphatic acid having more than four carbon atoms in the radicle attached to the carboxyl group, in an amount sufficient to impart the properties of such acid thereto.

9. A composition of matter for the destruction of insects, containing as an added ingredient any of the fatty acids derived from coconut oil in the free condition.

10. A composition of matter for the destruction of insects, containing as an added ingredient a sufficient amount of any of the fatty acids derived from coconut oil in the free condition, to impart the properties of such acid thereto.

11. A composition of matter for the destruction of plant parasites, containing as an added ingredient free lauric acid.

12. A composition of matter for the destruction of plant parasites, containing as an added ingredient a sufficient amount of free lauric acid to impart the properties of such acid thereto.

13. A composition of matter for the destruction of plant parasites, containing as an added ingredient and in the free condition any of the fatty acids derived from coconut oil.

14. A composition of matter for the destruction of plant parasites, containing as an added ingredient and in the free condition a sufficient amount of any of the fatty acids derived from coconut oil, to impart the properties of such fatty acid thereto.

15. A composition of matter for the destruction of plant parasites, containing an as added ingredient, and in the free condition, any aliphatic acid having more than four carbon atoms in the radicle attached to the carboxyl group.

16. A composition of matter for the destruction of plant parasites, containing as an added ingredient, any free aliphatic acid having more than four carbon atoms in the radicle attached to the carboxyl group, in an amount sufficient to impart the properties of such free aliphatic acid thereto.

17. A composition of matter for the destruction of plant parasites, containing as an added ingredient, and in the free condition, any normal monobasic aliphatic acid having more than four carbon atoms in the radicle attached to the carboxyl group.

18. A composition of matter for the destruction of plant parasites, containing as an added ingredient and in the free condition, any normal monobasic aliphatic acid having more than four carbon atoms in the radicle attached to the carboxyl group, in an amount sufficient to impart the properties of such normal monobasic aliphatic acid thereto.

19. A method of destroying plant parasites by bringing them in contact with a composition of matter containing free lauric acid.

20. A method of destroying plant parasites by bringing them into contact with a composition of matter containing any of the fatty acids derived from coconut oil, in the free condition.

21. A method of destroying plant parasites by bringing them into contact with a composition of matter containing in the free condition any normal monobasic aliphatic acid containing more than four carbon atoms in the radicle attached to the carboxyl group.

22. A method of destroying plant parasites by bringing them into contact with a composition of matter containing in the free condition any aliphatic acid containing more than four carbon atoms in the radicle attached to the carboxyl group.

EDOUARD HORACE SIEGLER.
CHARLES HOLCOMB POPENOE.